US006456305B1

United States Patent
Qureshi et al.

(10) Patent No.: US 6,456,305 B1
(45) Date of Patent: Sep. 24, 2002

(54) METHOD AND SYSTEM FOR AUTOMATICALLY FITTING A GRAPHICAL DISPLAY OF OBJECTS TO THE DIMENSIONS OF A DISPLAY WINDOW

(75) Inventors: Imran I. Qureshi; Andy Chin, both of Sunnyvale; Seema Maithel, Cupertino; Robert L. C. Parker, San Jose, all of CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/272,009

(22) Filed: Mar. 18, 1999

(51) Int. Cl.⁷ .................................................. G06F 3/14
(52) U.S. Cl. ....................... 345/800; 345/788; 345/798; 345/801; 345/781
(58) Field of Search ................................ 345/788, 798, 345/800, 801, 781, 720; 707/573, 517, 518

(56) References Cited

U.S. PATENT DOCUMENTS

| | | | | |
|---|---|---|---|---|
| 5,416,900 A | * | 5/1995 | Blanchard et al. | 345/346 |
| 5,557,728 A | * | 9/1996 | Garrett et al. | 395/340 |
| 6,133,913 A | * | 10/2000 | White et al. | 707/10 |
| 6,185,589 B1 | * | 2/2001 | Votipka | 707/517 |
| 6,256,650 B1 | * | 7/2001 | Cedar et al. | 707/517 |

* cited by examiner

*Primary Examiner*—Kristine Kincaid
*Assistant Examiner*—Thomas T. Nguyen
(74) *Attorney, Agent, or Firm*—Christensen O'Connor Johnson Kindness PLLC

(57) ABSTRACT

A method and system for automatically sizing and positioning a graphical display of HTML objects to fit the dimensions and video display resolution of a display window in a program such as a browser. A first facility translates slides in a slide show presentation program into a corresponding series of scalable Slide HTML pages. A scalable Slide HTML page has a SlideObj container that contains all of the objects in that page. Divisions in the scalable Slide HTML pages are created with nested DIV tags so that percentages related to default dimensions in the SlideObj container may be used to define the dimensions of a display space for a scalable Slide HTML page. Also, nested DIV tags are used to define percentage based positions, hyperlink areas and font sizes for HTML objects in the display space of the scalable Slide HTML page. The HTML objects include text, images, and image maps associated with hyperlinks. A scalar is calculated to retain the original aspect ratio when fitting a display space and HTML objects included in the scalable Slide HTML page to different display window dimensions and video display resolutions. This scalar is also used to calculate the font size of the text objects and the hyperlink area for the hyperlinks (imagemaps). User interface controls are provided to select options for automatically fitting the HTML objects in the scalable Slide HTML page to the size of the display window.

32 Claims, 16 Drawing Sheets

```
Slide0001.htm
  <html>
  <body>
352       div id="SlideObj" style = "position: absolute; top:
          0; left: 0; width: 640px; height: 480px; background-
          color: white; font size:16; clip:rect(0%, 101%, 101%, 0%);
          visibility: hidden">
354            div id="S1" style = "position: absolute;
               top:100%; left:100%; width:100%; height: 100%;
               background-color: white; font size:75%;"> </div>

356            div id="S2" style = "position: absolute;
               top:100%; left:100%; width:100%; height: 100%;
                background-color: white; font size:125%; "> </div>
      </div>

</body>
  </html>
```

*Fig.12.*

```
Slide0001.htm
<html>
<body>

352  <div id="SlideObj" style = "position: absolute;
        top:0; left:0; width:640px; height:480px;
        background-color: white; font size:16; clip:rect(0%,
            101%, 101%, 0%); visibility:
                    hidden">
362         <div style = "position: absolute; top:
                        80.25%;
        left:8.5%; width:52.99%; height:9.03%; font size:75%">
            SAILING IS A POPULAR SPORT WORLDWIDE.

364             <div style =
                    "position:absolute;
            top:30%;left:40%;width:70%;height:60%;fon
                            t
                size:75%">A PICTURE OF MY BOAT</
                            div>
        370    < map name="map1">

< area onclick="window.event.cancelBubble=true"

target=" parent" ;href="http://msw/hrweb";

shape = "polygon" ;

coords="1, 1, 1, 64, 64, 64, 64, 1">

< /map>
        366    < div style = "position: absolute; top:
                                105%;
            left: 500%; width: 95%; height: 1000%">
            368
                 <img src = "sailboat1.bmp"; usemap="map1";>
            </div>
        </
        div>
    </body>
    </html>
```

*Fig.13.*

METHOD AND SYSTEM FOR AUTOMATICALLY FITTING A GRAPHICAL DISPLAY OF OBJECTS TO THE DIMENSIONS OF A DISPLAY WINDOW

FILED OF THE INVENTION

The present invention relates to the graphical display of objects in a display space on a display window, and more particularly, to a method and a system for automatically sizing a graphical display of objects included in a display space to fit the dimensions of a display window.

BACKGROUND OF THE INVENTION

Computer programs often have associated data files that are processed by the computer program during its normal execution. A data file can contain information that is processed and presented to a user either in a video presentation or an audio presentation, or a combination of video and audio. Presentation programs are examples of computer programs that process an associated data file.

Presentation programs enable a user to create, edit, manage, and perform "presentations" such as a slide show with a computer. One example of a popular presentation program is "PowerPoint," available from "Microsoft Corporation", of Redmond, Wash. A slide show presentation includes a set of electronic "slides," each slide corresponding to one screen or page of output. An electronic slide may also be converted to a 35 mm or overhead transparency and displayed in a standard slide projector or overhead projector. Each slide contains one or more objects, such as text, graphical images, or graphic automation. A slide may also include a sound object or video that is played when the slide is displayed during a "slide show" performance.

A presentation program "performs" a slide show by sequentially displaying a series of slides contained within the slide show presentation. The slides are displayed on a computer screen or projected onto a separate surface. During a performance of a slide show, a "presenter" controls the performance by invoking commands to "advance" to the next slide. A command can be entered using a keyboard, a mouse, or another suitable input device.

Alternatively, an author of a slide show presentation can include slide "timings" with each slide. A slide timing corresponding to a slide indicates the number of seconds that the slide is displayed before the presentation program automatically advances to the next slide. During a performance of a slide show, a slide show presentation automatically advances to the next slide when the existing slide's timing ends. An ordered sequence of slides is predetermined by a slide show presentation author. During a performance of a slide show, a presenter can enter commands to alter the sequence of slides.

The "PowerPoint" program enables a user to save a slide show in an associated slide presentation file, so that the slide show can be recreated at another location that has access to "PowerPoint" and the slide presentation file. Unfortunately, a presentation program such as "PowerPoint" is not common place and many computer users do not have access to this type of program. In the past, slide presentation files were often distributed on a storage medium that also contained at least a display only version of the presentation program for graphically displaying the slide show to a user with the information stored in the slide presentation file. Since there is limited space available on a contemporary storage medium that is intended for mass distribution, the number and size of slide presentation files that can economically be distributed in this manner is presently limited. Additionally, since a slide show included in a slide presentation file must be displayed with some version of a presentation program, additional effort is required to locate, purchase and install the program before the slide show can be graphically displayed to other users, if not previously installed.

An on-line information system typically includes one computer system (a server) that makes information available so that other computer systems (clients) can remotely access the information. The server manages access to the information, which can be structured as a set of independent on-line services. The server and client communicate via messages conforming to a communication protocol and sent over a communication channel such as a computer network or through a dial-up connection.

Information resources managed by the server may include files, databases, and programs on the server system or on an external computer system. The information that the server provides may simply be stored on the server, may be converted from other formats manually or automatically, may be computed on the server in response to a client request, may be derived from data and programs on the server or other machines, or may be derived by any combination of these techniques.

The user of an on-line service typically uses a browser program executed on the client system to access the information managed by the on-line service. The browser enables the user to selectively view, search, download, print, edit, and/or file the information managed by the server. On-line services are available on the World Wide Web (WWW), which operates over the global Internet. The Internet interconnects a large number of otherwise unrelated computers or sites. Similar services are available on private networks called Intranets that may not be connected to the Internet, and through local area networks (LANs). The WWW and similar private architectures provide a "web" of interconnected document objects. On the WWW, these document objects are located at various sites on the global Internet.

Among the types of document objects in an on-line service are documents and scripts. Documents that are published on the WWW are written in the Hypertext Markup Language (HTML). HTML documents can be created using programs specifically designed for that purpose or by executing script files. An HTML document includes a hierarchical set of markup elements; most elements have a start tag, followed by content, followed by an end tag. The content is a combination of text and nested markup elements. Tags, which are enclosed in angle brackets ('<' and '>'), indicate how the document is structured and how to display the document, as well as destinations and labels for hypertext links. There are tags for markup elements such as titles and headers, text attributes such as bold and italic, lists, paragraph boundaries, links to other documents or other parts of the same document, in-line graphic images, and for many other features.

The following lines of exemplary HTML code briefly illustrate how the language is used in a sample HTML document:

Some words are <B>bold</B>, others are <I>italic</I>. Here we start a new paragraph.<P>

Here's a hyperlink to the <A HREF=a URL to the home page of Microsoft corporation>microsoft corporation</A>home page.

This sample HTML document is a hypertext document because it contains a hypertext link to another document in the line that includes "HREF=." The format of this link is described below. A hypertext document may also have a link to other parts of the same document. Linked documents may generally be located anywhere on the Internet. When a user is viewing the document using a browser, the links are displayed as highlighted words or phrases. For example, using a browser, the sample document above might be displayed on the user's screen as follows:

Some words are bold, others are italic. Here we start a new paragraph.

Here's a link to the Microsoft Corporation home page.

In a browser, the link may be selected, for example, by clicking on the highlighted area with a mouse. Typically, the screen cursor changes when positioned on a hypertext link. Selecting a link will cause the associated document to be displayed. Thus, clicking on the highlighted text "Microsoft Corporation" would fetch and display the associated home page for that entity. Similarly, the HTML language also provides a mechanism (the image or "IMG" element) that enables an HTML document to include an image that is stored as a separate file. When the end user views the HTML document, the included image is displayed as part of the document, at the point where the image element was positioned in the document. Also, when the user is viewing an HTML page that includes a display of a thumbnail image using a browser, a hyperlink connection from the thumbnail image to the original image can be activated by selecting the displayed thumbnail image. In this way, the original image is retrieved and graphically displayed when the user selects the thumbnail image.

One of the most commonly installed programs on a computer is a browser for graphically displaying an HTML page that may be accessed locally or through an on-line service connected to a network such as the Internet. The browser program may be a stand alone program such as the "Microsoft Corporation's Internet Explorer" or the browser's functionality may be integrated into a computer operating system, e.g., the "Windows 98" operating system available from the "Microsoft Corporation." Although the browser is used to generate a graphical display of objects included in an HTML page, the dimensions of the browser's display window can differ from the dimensions initially coded for the display space of the page. The size of the browser's display window can vary according to the resolution of the video display or the window dimensions that are selected by a user.

The HTML language provides for initially encoding the graphical display of an HTML page's display space to defined dimensions such as 640×480 pixels, i.e., 640 vertical lines by 480 horizontal lines in a video display. In the prior art, when the selected dimensions of the display window and/or the resolution of the video display did not correspond to the encoded values of the display space of the HTML page, the objects in the page were not optimally displayed to a user. For example, if the HTML page had defined dimensions of 640×480 lines of resolution, the graphical display of the page would appear relatively small in a display window sized to fit a 1024×768 video display resolution.

On the other hand, if the same HTML page was displayed in a browser display window sized to fit a 320×240 video display resolution, the graphical display of the document would appear significantly larger than the displayable area in the display window. In this case, the user would have to scroll through the display window to view the entire graphical display of the objects in the HTML page's display space. Similarly, if at least one of a user selected dimension for the display window was less than a dimension of the HTML page's display space, the entire graphical display of the objects in the display space would only be viewable by scrolling.

In the prior art, one solution to this problem has been to create different HTML pages that are encoded for different video display resolutions in an HTML document. Another solution has been to create all of the HTML pages in a document at the lowest video display resolution offered by most video displays, e.g., 640×480. None of the prior art solutions solve the problem of automatically fitting the graphical display of an HTML page to a display window that has a video display resolution that is different than the video display resolution initially encoded for the HTML page.

It is desirable to have a facility that enables a presentation program to generate an HTML document that includes a set of HTML pages that closely relate to each slide in a slide presentation file created by the program. Preferably, such a facility would enable another user to employ another program, such as a browser, already installed on the other user's computer to graphically display an HTML page that corresponds to a related slide. In this case, when the HTML document related to the slide show presentation is distributed to other users on a storage media, the media would not have to include a version of the presentation program. Since more of the capacity of the storage media could be used for storing HTML documents related to slide show presentations, significantly larger slide show presentations could be distributed on the same storage media.

Also, an HTML document corresponding to the slide show presentation could be distributed over a network as an information resource with an on-line service, so that another user could easily download the document to their computer and graphically display the HTML pages corresponding to the slides in the slide show presentation with a program already installed on the computer such as a browser program. Additionally, it is preferable that the facility would automatically fit the dimensions and positions of a graphical display of objects in an HTML page to a display window when the size and/or video display resolution of the display window is different than the display space of the HTML page.

SUMMARY OF THE INVENTION

The present invention provides a method for automatically fitting the graphical display of an object in a display space of a scalable page to the size and video resolution of a display window. First, a page and its contents, e.g., an object disposed in a display space, are translated into a scalable page that is contained in a master container. The size of the display space is related to the default size of a display space for the master container. Also, the size and position of the object in the display space of the scalable page is related to the size of the scalable page's display space.

The present invention determines if at least one of the dimensions of a display window is different than a corresponding dimension of the display space in the scalable page. If different, a scalar that corresponds to the difference in the dimensions of the display window and the display space of the scalable page is calculated. The scalar is employed to resize and reposition the object and the display space in the scalable page by calculating a new size for the display space that is related to the size of the display window and the default size of the master container. The calculation of the new size for the display space causes the related size and position of the object to automatically change in proportion to the new size. Finally, the present invention automatically fits the graphical display of the resized and repositioned objects and display space in the scalable page to the size of the display window, so that the user may view the object in the display space of the scalable page without having to scroll the display window back and forth.

The page to be translated may be a slide that was created with a presentation program or a document created with an editor. Also, the scalable page, the master page and the object may be coded in a computer language that supports percent-based nesting of a size and a position of an object and a display space. For example, the computer language may be HTML, DHTML, CGI, Javascript and VRHTML.

In accordance with other aspects of this invention, the graphical display of the resized and repositioned objects and display space are only displayed after the display space and the object have been resized and repositioned to fit the size of the display window.

In accordance with further aspects of this invention, maintaining the original aspect ratio is considered when determining the value for the scalar.

The object in the display space may be a text object that is associated with a percent-based font size, which is related to a default font size included in the master page. The percent-based font size may be resized with the scalar and text objects may be nested. A minimum and maximum size of font may be selected for resizing.

The object included in the scalable page may be an image map object associated with a hyperlink. The image map object is sized and positioned in the scalable page with a set of coordinates that are stored in an array. The scalar is used to calculate a new set of coordinates when fitting the graphical display of the image map object to the display window.

The object in the display space of the scalable page may be an image object. The image object may have a type that includes bitmap and vector graphic. Also, the display window may be associated with different types of programs such as a browser and an editor. DIV tags may be used to support percent-based sizing and positioning of the display space and the object in the scalable page. The setting of a flag in the scalable page determines when the object in the display space of the scalable page may be graphically displayed in the display window.

The present invention also provides a system for implementing the method described above and a computer readable media for distributing logical instructions that enable a system to perform the previously described method.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 12 illustrates an exemplary HTML code listing that shows how nested DIV tags employ percentages to define the dimensions of a display space and the font size for text in a SlideObj container; and FIG. 13 shows an exemplary HTML code listing that illustrates how different types of objects are nested in a scalable Slide HTML page.

DETAILED DESCRIPTION OF THE PREFERRED EMBODIMENTS

The present invention is directed to generating a scalable HTML page and fitting the entire graphical display of objects in a display space of the page to the dimensions and resolution of a display window of a program such as a browser. Generally, a first facility translates at least one page of a document that contains different types of graphically displayable objects into the scalable HTML page. In one embodiment of the invention described below, slides with graphically displayable objects in a slide presentation file are used to generate a plurality of corresponding scalable HTML pages, i.e., Slide HTML pages. It is envisioned that other types of files that includes slides and/or pages with graphically displayable objects could also be translated into scalable HTML pages that correspond to each slide. These other types of files may be created with other programs including word processors, desktop publishers, spreadsheets, and editors.

The present invention ensures that the respective position and size for each object and the display space of the scalable HTML page are maintained when the page is graphically displayed in a display window that has dimensions and/or a video display resolution different than the values encoded for the page. The present invention provides a second facility that automatically fits the graphical display of the objects included in the scalable HTML page to the dimensions of the display window. The second facility maintains the original aspect ratio for the objects in the scalable HTML page that are graphically displayed in the display window. The present invention thus enables a user to view the graphical display of every object in a scalable HTML page without having to scroll back and forth in the display window.

Exemplary Operating Environment

Figure 1:
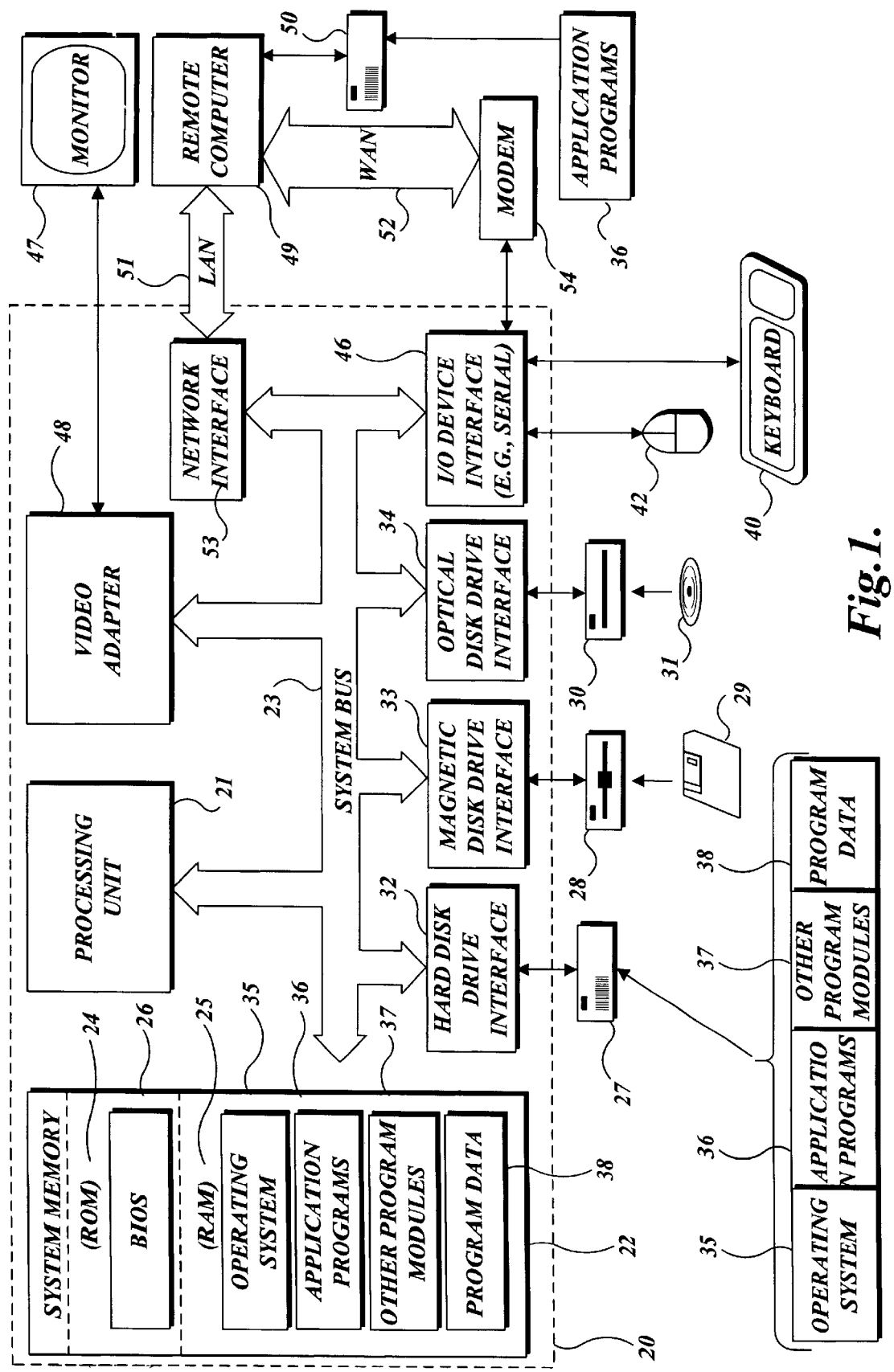
FIG. 1 displays an overview of an exemplary operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Architecture for Scalable HTML Pages

While the invention can be packaged in various ways depending upon the environment of use, in one actual embodiment, a first facility translates each type of object included in a slide into an HTML object and disposes the object at a related position in a scalable HTML page, i.e, a Slide HTML page. Clip region boundaries, i.e., the edges, for the displayed area (display space) of the Slide HTML page are set so that any object outside the clip boundaries of the display space will not be rendered. The display space for the Slide HTML page is set with a DIV tag. DIV tags are used to structure the graphical display of pages in an HTML document as a hierarchy of subdivisions. This hierarchy supports percentage-based dimensions for objects nested within the sub-divisions created by the DIV tags.

The first facility also provides for creating a container for at least one Slide page created from a slide. The divisions created by nested DIV tags enable the SlideObj container to provide default dimensions and a default font size for the display space and text objects in a Slide HTML page that is contained in the SlideObj container. Since DIV tags are used to define the dimensions and font size for a SlideObj container, other DIV tags that are nested in the Slide HTML page may reference the default dimensions of the SlideObj container's display space as a percentage (greater than or less than 100%) to define the dimensions of the display space for each object on the Slide HTML page. Similarly, a font size for a text object in each Slide HTML page can be referenced as a percentage (greater than or less than 100%) of the default font size in the SlideObj container.

FIG. 12 illustrates an HTML code fragment 350 with a DIV tag 352 for a SlideObj container that defines a default font size of 16 and 635 vertical pixels (lines of resolution) by 476 horizontal pixels (lines of resolution) as the display space for the page. A pair of nested DIV tags 354 and 356 employ percentages to define the dimensions of a display space and a font size for text that are contained in the SlideObj container. The nested DIV tags 354 and 356 (identified as S1 and S2) include percentage values that are based on the default dimensions (635 by 476 pixels) and the font size (16) of the SlideObj container. In this case, the S1 DIV tag 354 will display text objects with a default font size of 12 (75% of 16) and the S2 DIV tag 356 will display text objects with a font size of 20 (125% of 12). Also, the S1 and S2 DIV tags 354 and 356 will display text objects in display spaces that have the same dimensions (100% of 635 and 100% of 476) as the default dimensions of the display space of the SlideObj container.

The nested divisions created by DIV tags in a Slide HTML page enables an HTML object to be positioned in the Slide HTML page's display space as a percentage of the dimensions of the display space. In FIG. 13, a text object, i.e., SAILING IS A POPULAR SPORT WORLDWIDE, is disposed within a division defined by a nested DIV tag 362. The position of this text object in the Slide HTML page's display space is based on a percentage that is relative to the dimensions of the display space defined by the division created by DIV tag 354 for the page. In this case, the top of the text object is disposed at 80.25% of the height (100% of 476 pixels) of the display space for the Slide HTML page and the left side of the text object is positioned at 8.5% of the width (100% of 635 pixels) of the display space.

The first facility also provides for nesting text, image and image map objects within the divisions created by DIV tags as a percentage relative to another position of another object in the display space of a Slide HTML page. In this way, a hierarchy of relative positions may be created for objects disposed in the display space of the Slide HTML page. For example, in FIG. 13, another text object, i.e., A PICTURE OF MY BOAT, has its position based on a percentage that is relative to the dimensions of the display space for a Slide HTML page defined by another HTML code fragment 360. This text object is disposed in a division created by a nested DIV tag 364 which defines the object's top position as 30% of 80.25% of 100% (height of 476 pixels) of the display space of the Slide HTML page. Similarly, an image object, i.e., "sailboat1.bmp", is disposed in a division created by a nested DIV tag 368 that defines a top position that is 105% of 80.25% of 100% of the display space of the Slide HTML page.

Additionally, when a hyperlink is associated with an image object, the dimensions of a region associated with the image object are not expressed as a percentage of the dimensions of the display space of the Slide HTML page. Instead, an image map tag 370 is employed to define an explicit set of coordinates defining the region of the image object that will activate the hyperlink when selected by a user. Since the image map object dimensions are not percentage based, the second facility employs at least one script to resize these dimensions to fit a display window's dimensions. However the facility also supports percent based image maps if they are supported by the browser.

Exemplary Graphical Displays

Figure 2:
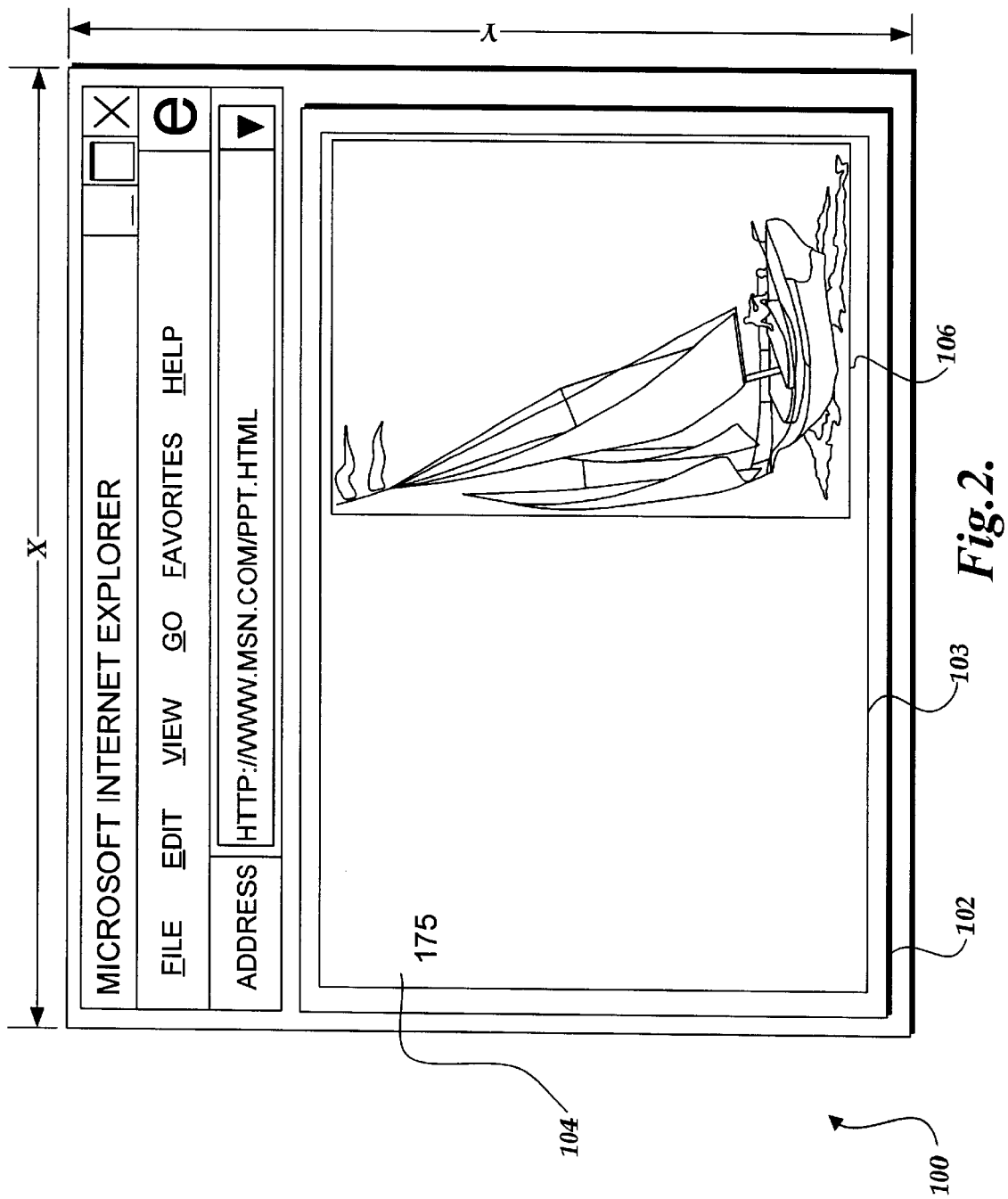
FIG. 2 shows an exemplary browser graphically displaying a scalable Slide HTML page that includes text and a graphic image.

The present invention is described below with respect to a graphical display of objects included in a sample Slide HTML page. Prior to describing the process of the invention, a series of screen diagrams showing the results of applying the invention to the sample Slide HTML page is described. FIG. 2 is a screen diagram showing an exemplary display of a browser 100 and a display window 102 that graphically displays the objects in the Slide HTML page, i.e, a display space 103, a text object 104 containing the words "SAILING IS A POPULAR SPORT WORLDWIDE." and an image object 106 showing a graphic of a sailboat. In this case, browser 100 has a height dimension (y) and a width dimension (x) that are approximately proportional. Also, the dimensions of the browser's display window 102 are equal to the originally encoded dimensions for the display space 103 of the Slide HTML page.

Figure 3:
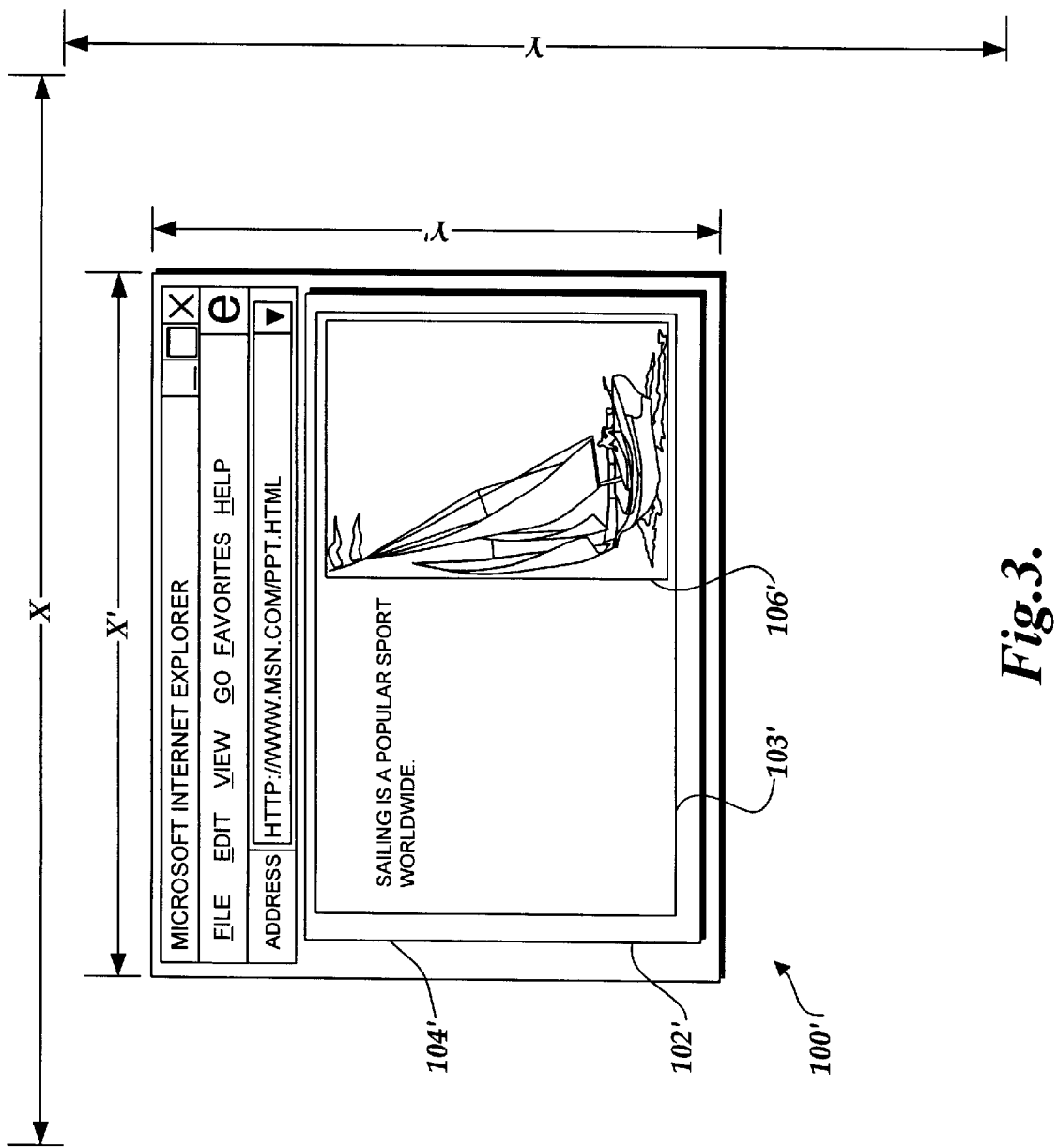
FIG. 3 illustrates the browser graphically displaying the Slide HTML page after the width and height of the browser have been proportionally decreased.

FIG. 3 is another screen diagram illustrating a browser 100' that has a width dimension (x') and a height dimension (y') that are proportionally less than the respective width dimension (x) and height dimension (y) of browser 100 as shown in FIG. 2. Since originally encoded dimensions of the display space 103 of the HTML page do not equal either the height or width dimensions of a display window 102', the present invention has automatically resized and repositioned a display space 103' and the contents of the Slide HTML page, in proportion to the smaller display window 102' dimensions. In particular, the display space 103', a text object 104' and an image object 106' have been proportionally reduced in size and repositioned in the display window 102', so that the contents the Slide HTML page proportionally fit the dimensions of the display window.

In changing the dimensions and positions of the objects in the Slide HTML page to accommodate different dimensions in the display window 102', the present invention maintains the original aspect ratio for resized objects. In particular, the present invention calculates the aspect ratio (which is width divided by height) of the browser window and compares it with the aspect ratio of the SlideObj container. For example, let's say the width and height of the browser window are 200 and 100, respectively. The aspect ratio will be 2 (200/100). Similarly, if the width and height of the SlideObj container are 75 and 50, respectively, the aspect ratio for the SlideObj container will be 1.5 (75/50). The present invention calculates that if the SlideObj container's width were resized to 200, the height would have to be 133 (200/1.5). This is larger than the width of the browser window so it will not fit. Thus the right solution is to resize the height of the SlideObj container to 100, which will result in a width of 150. Since these dimensions fit in the browser window, these height dimensions are used to calculate a scalar, which is used to maintain the original aspect ratio for resized and repositioned objects. Similarly, if the determination was that the width should be changed, then the width dimension of the display space 103' and the width dimension (x') of the display window 102' would be employed to calculate the scalar to maintain the original aspect ratio.

Figure 4:
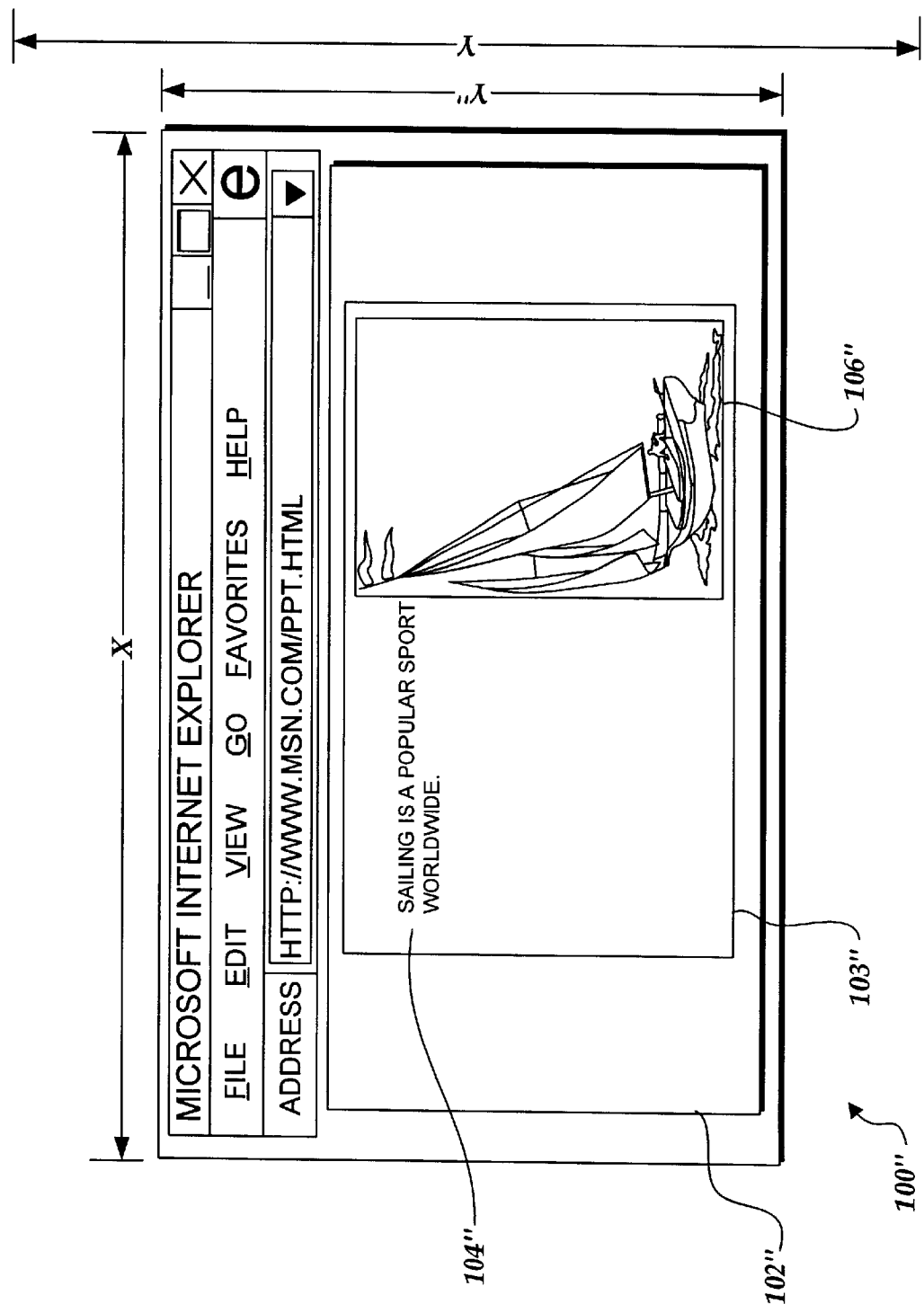
FIG. 4 shows the browser graphically displaying the Slide HTML page after the height of the browser has been decreased, its width remaining constant.

FIG. 4 displays a browser 100" that has a width dimension (x) equal to the width dimension (x) of browser 100 as illustrated in FIG. 2 and a height dimension (y") that is substantially less than the height dimension (y) of browser 100. Because the originally encoded height dimension of the Slide HTML page does not equal the height dimension of a display window 102", the present invention has automatically resized and repositioned a display space 103" and the objects in the Slide HTML page, i.e., a text object 104" and an image object 106", to fit the smaller height dimension in the display window. As discussed above, the present invention calculates a scalar when changing the dimensions of the text object 104", image object 106", and display space 103" in the graphical display of the HTML page. In this case, the height dimensions of the display window 102" and the display space 103" are used to calculate a scalar to maintain the original aspect ratio.

Figure 5:
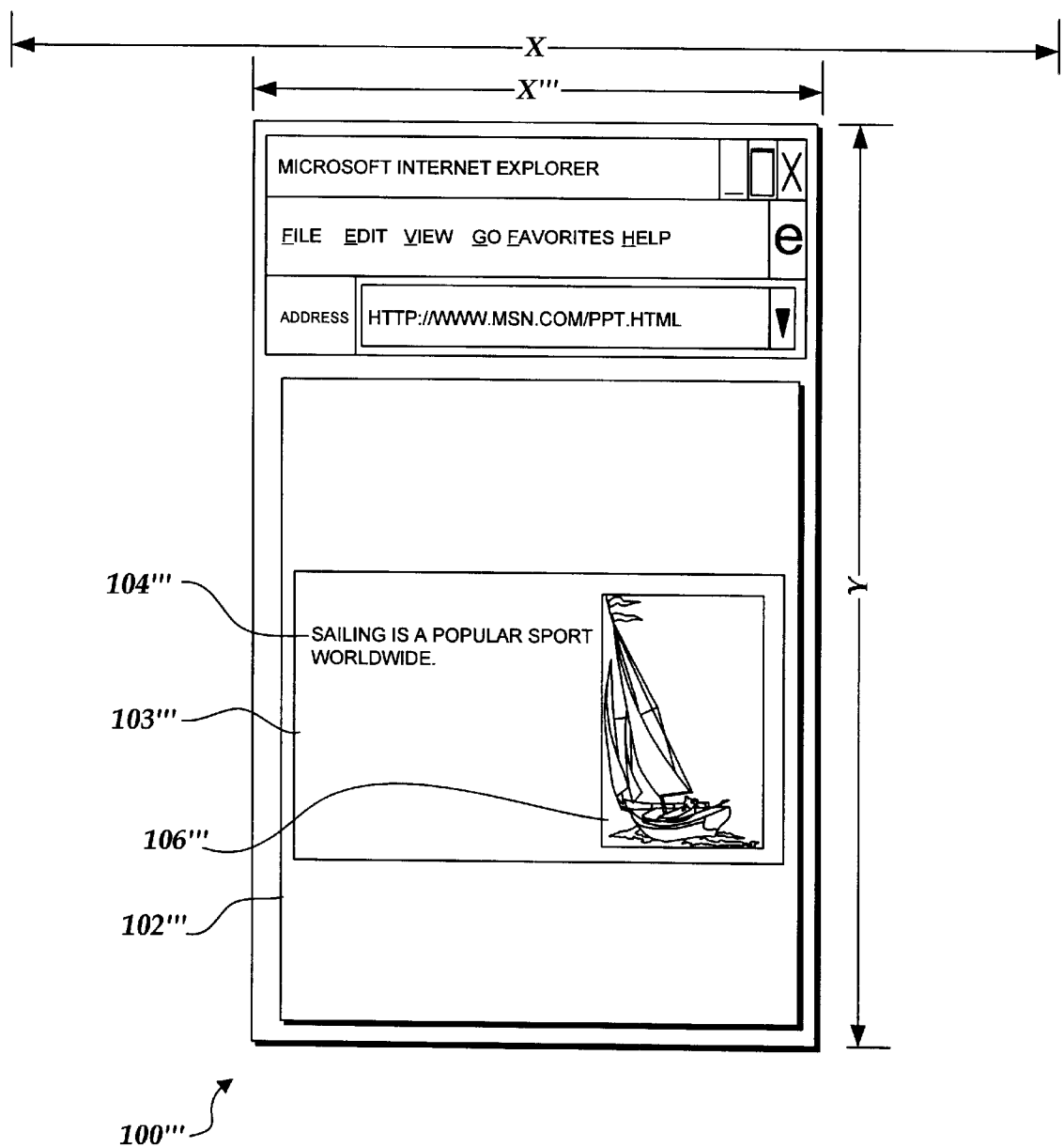
FIG. 5 illustrates the browser graphically displaying the Slide HTML page after the width of the browser has been decreased, its height remaining constant.

In FIG. 5, a browser 100''' is shown that has a height dimension (y) equal to the height dimension (y) of browser 100 as illustrated in FIG. 2 and a width dimension (x''') that is substantially less than the width dimension (x) of browser 100. In this case, the originally encoded width dimension of the Slide HTML page does not equal the width dimension in a display window 102''' of the browser 100'''. The present invention has automatically resized and repositioned a display space 103''' and the objects in the Slide HTML page to fit the smaller width dimension of the display window 102'''. Again, the display space 103''', a text object 104''' and an image object 106''' have been proportionally reduced in size and repositioned in the display window 102'''. The width dimensions of the display window 102''' and the display space 103''' have been used to calculate a scalar to maintain the original aspect ratio.

Figure 6:
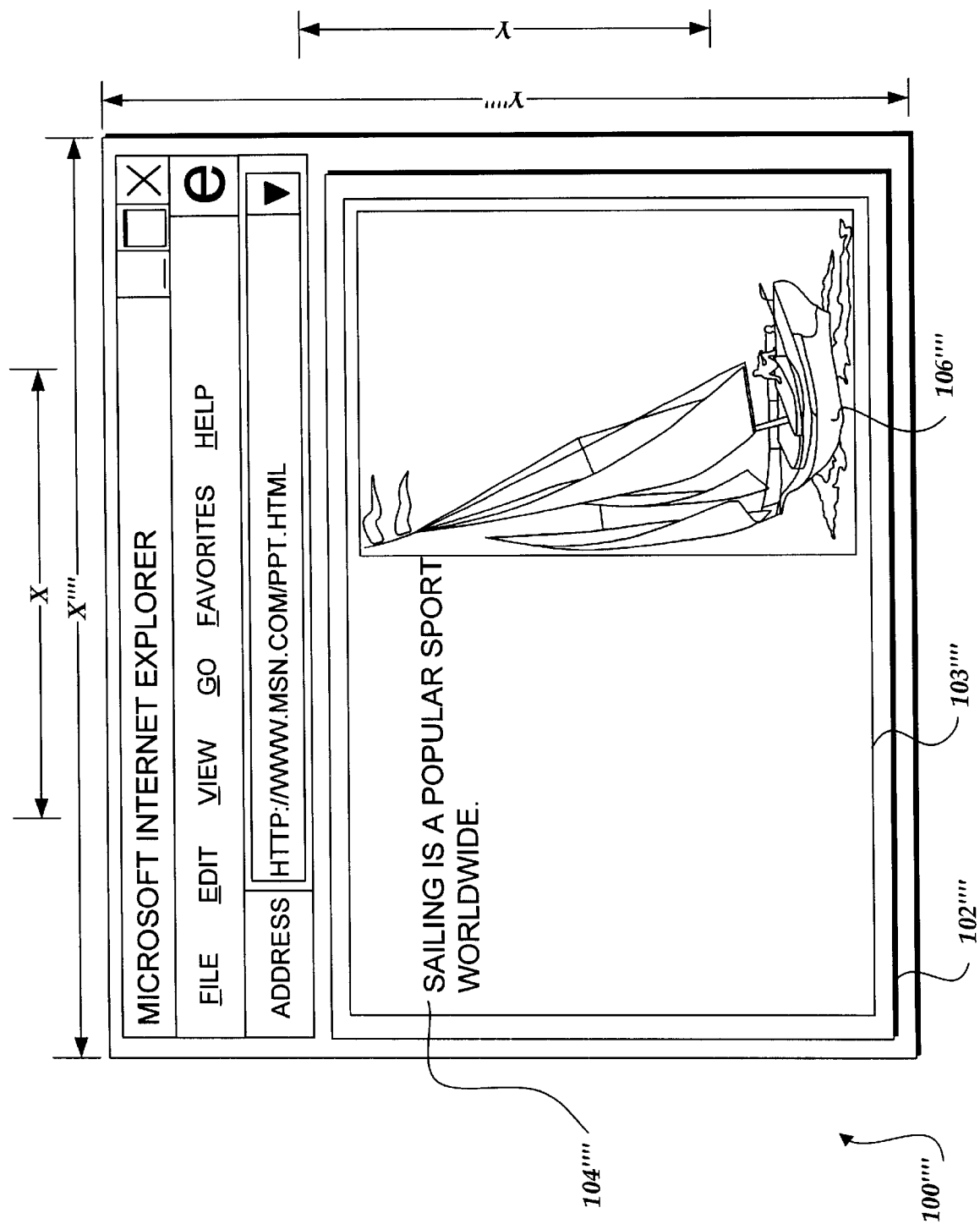
FIG. 6 displays the browser graphically displaying the Slide HTML page after the width and height of the browser have been proportionally increased.

FIG. 6 is another screen diagram illustrating a browser 100'''' that has a width dimension (x'''') and a height dimension (y'''') that are proportionally greater than the respective width dimension (x) and height dimension (y) of browser 100 as shown in FIG. 2. Even though the originally encoded dimensions of the Slide HTML page do not equal either dimension of a display window 102'''' of browser 100''''. The present invention has resized and repositioned the objects in the Slide HTML page, i.e., a display space 103'''', a text object 104'''' and an image object 106'''', in proportion to the larger dimensions in the display window 102''''. In this case, the height dimensions of the display window 102'''' and the display space 103'''' are used to calculate a scalar to maintain the original aspect ratio.

Figure 7:
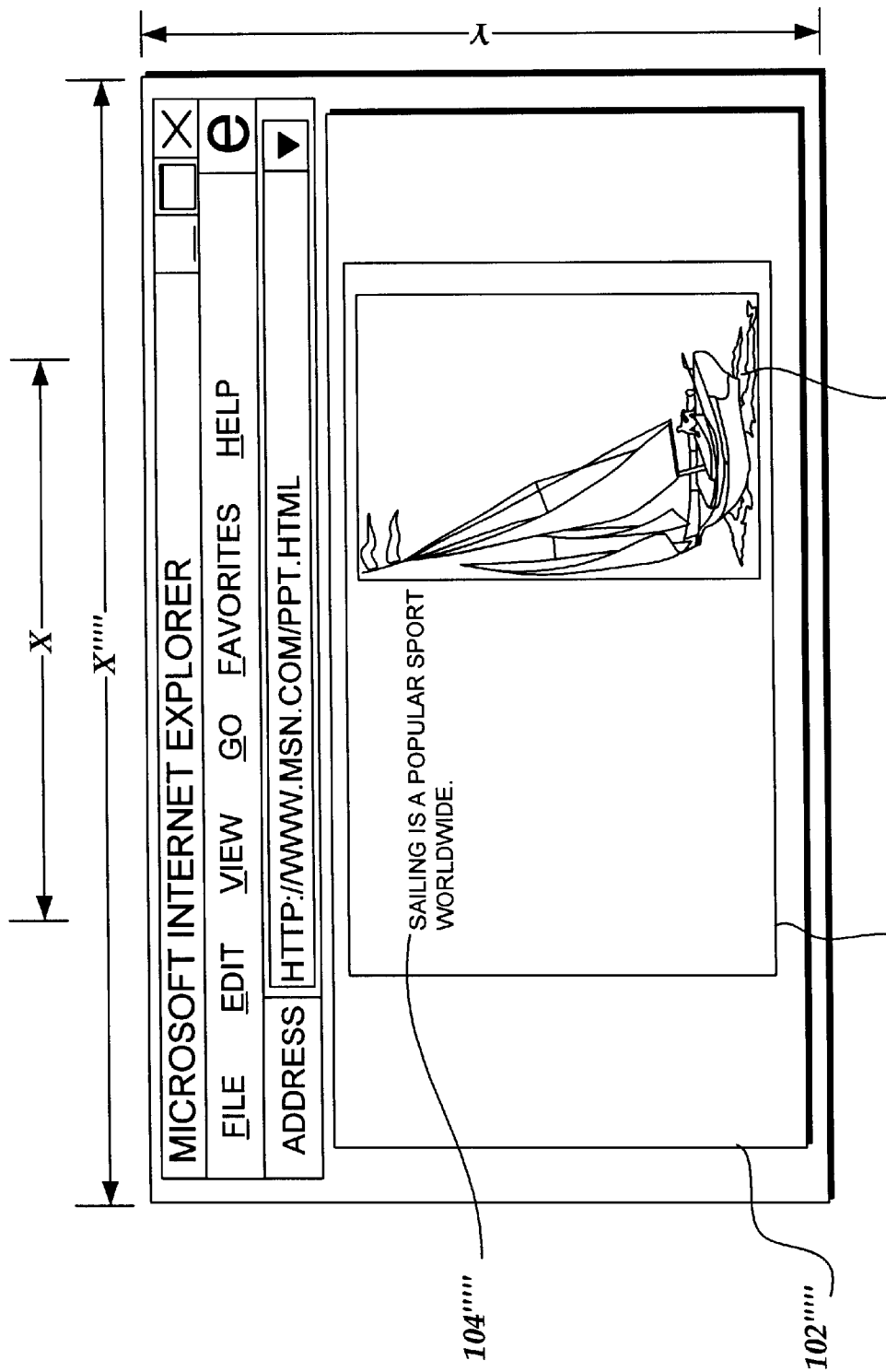
FIG. 7 illustrates the browser graphically displaying the Slide HTML page after the width of the browser has been increased, its height remaining constant

FIG. 7 displays a browser 100''''' that has a height dimension (y) equal to the height dimension (y) of browser 100 as illustrated in FIG. 2 and a width dimension (x''''') that is substantially greater than the width dimension (x) of browser 100. Because the originally encoded width dimension of the Slide HTML page does not equal the width dimension of the browser 100''''', the present invention has automatically resized and repositioned the objects in the Slide HTML page, i.e., a display space 103''''', a text object 104''''' and an image object 106''''', to fit the larger width dimension in a display window 102'''''. The width dimensions of the display window 102''''' and the display space 103''''' were used to calculate a scalar to maintain the original aspect ratio.

Figure 8:
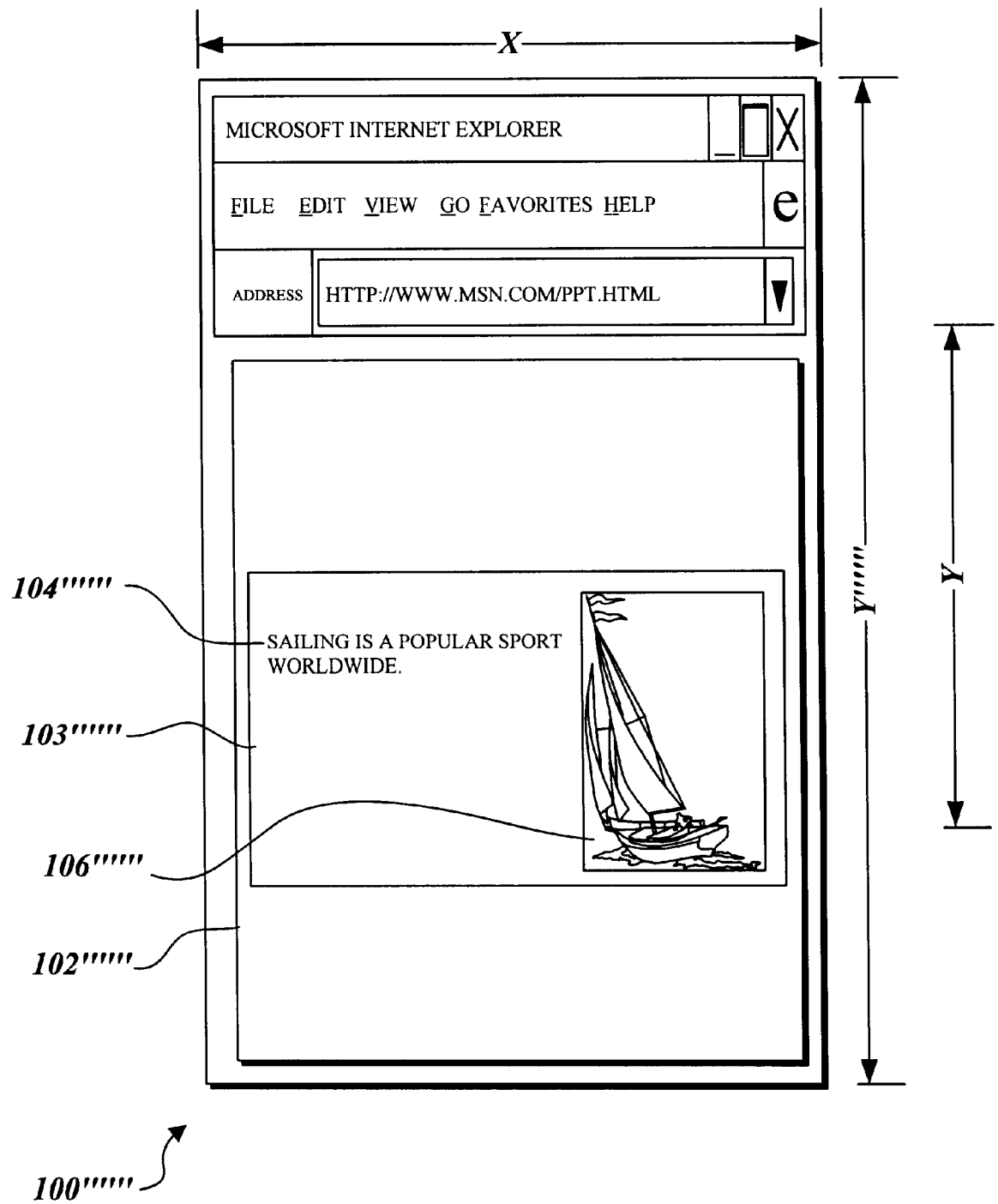
FIG. 8 shows the browser graphically displaying the Slide HTML page after the height of the browser has been increased, its width remaining constant.

In FIG. 8, a browser 100'''''' is shown that has a width dimension (x) equal to the width dimension (x) of the browser 100 as illustrated in FIG. 2, and a height dimension (y'''''') that is substantially greater than the height dimension (y) of the browser 100. Even though the originally encoded height dimension of the Slide HTML page does not equal the height dimension in a display window 102'''''' of the browser 100'''''', the present invention has automatically resized and repositioned a display space 103'''''' and the contents of the Slide HTML page, i.e., a text object 104'''''' and an image object 106'''''', in proportion to the larger height dimension in the display window 102''''''. In this case, the width dimensions of the display window 102'''''' and the display space 103 '''''' were used to calculate a scalar to maintain the original aspect ratio.

Flow Diagram for Generating Slide HTML Pages from Slides

Figure 9A:
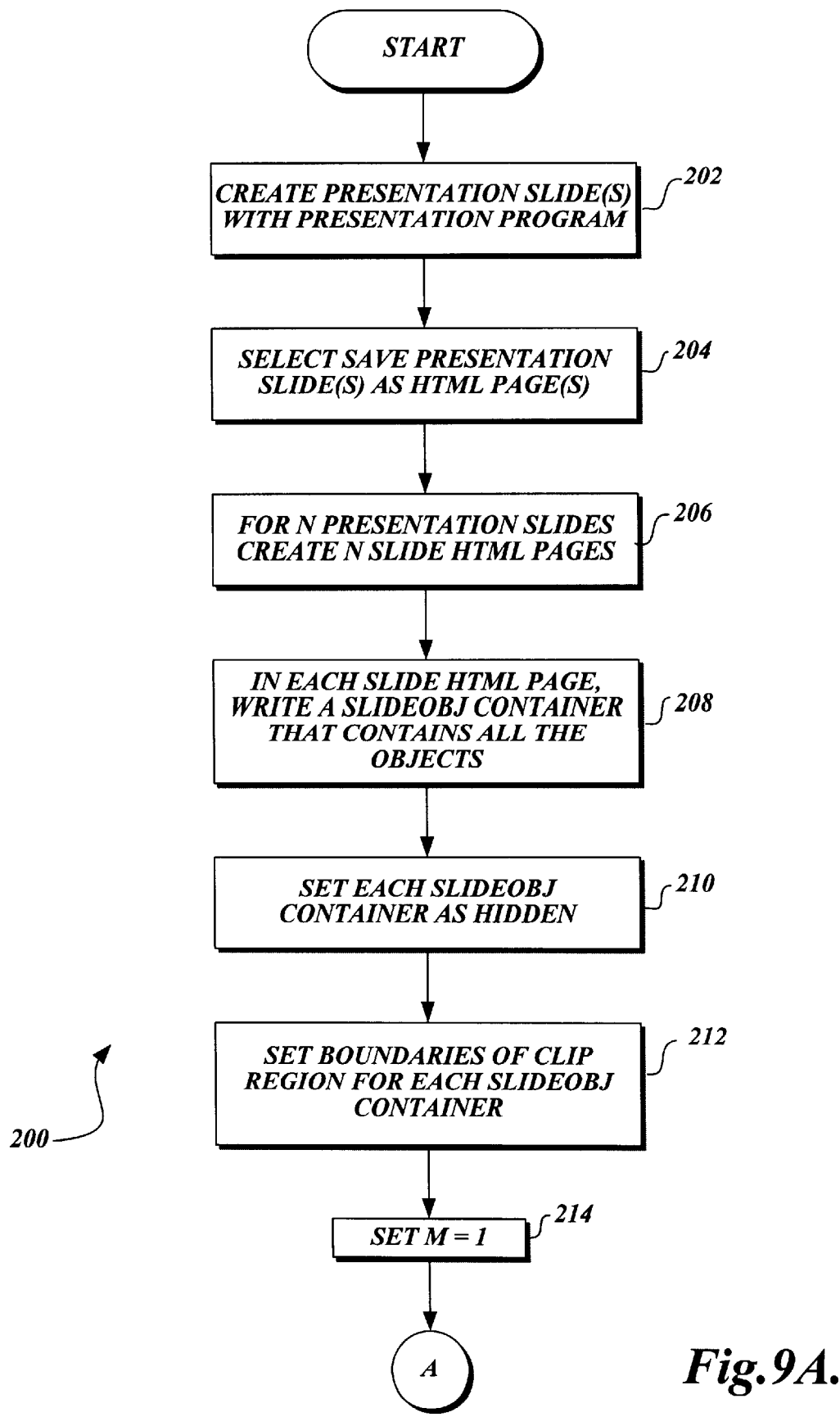
FIGS. 9A and 9B display an overview of a method for generating a scalable Slide HTML page for each corresponding slide created by a presentation program.
Figure 9B:
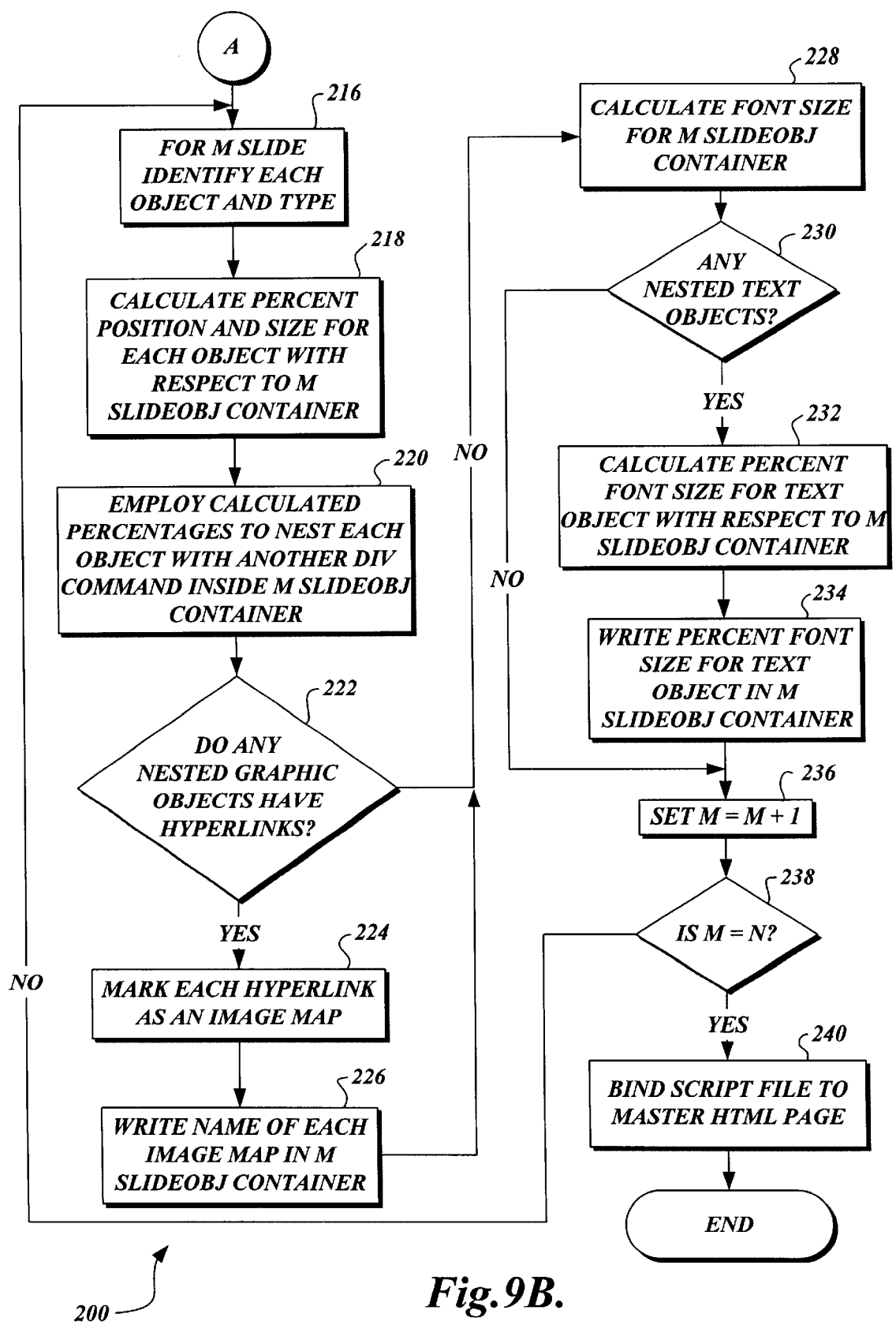

FIGS. 9A and 9B comprise a logic flow diagram 200 showing the process performed by a first facility in accordance with the present invention for automatically converting slides previously created with a presentation program into a series of corresponding scalable Slide HTML pages that include graphically displayable objects. A second facility described below automatically fits the graphical display of the objects included in the scalable Slide HTML pages to the dimensions and/or video display resolution of a display window in another program such as a browser.

Moving from a start block in FIG. 9A, at a block 202, a presentation program creates a series of slides for a slide show presentation that is saved in a slide presentation file. The logic moves to a block 204, where a "SaveAs" command is selected in the presentation program that indicates to the first facility that the slides in the slide presentation file are to be translated into a corresponding series of scalable Slide HTML pages. Then, in a block 206, for each of the (N) slides in the slide presentation file, a corresponding Slide (N) HTML page is created. The display space for each Slide HTML page is defined with a SlideObj container that contains other DIV tags.

As discussed above, DIV tags create divisions that enable the position and size of an object and a display space to be defined as a hierarchical percentage of another set of dimensions such as the default values of the SlideObj container. The DIV tag divisions enable a Slide HTML page's display space to be sized and positioned as a percentage of the display space of a container, i.e., the SlideObj container. Further, the size of the SlideObj container's display space default dimensions are measured in pixels (lines of video display resolution). The present invention can automatically compensate for different video display resolutions because the fitting of objects and a display space included in a Slide HTML page to a display window is based on the number of lines of resolution (pixels) actually used in the display window. For example, when a different video display resolution is used with a display window, the number of lines of resolution that define the dimensions of the display window will also proportionally change. In this case, as pictorially illustrated in FIGS. 2–8 and described above, the present invention automatically fits the graphical display of the Slide HTML page to the new dimensions (number of lines of resolution) of the display window.

At a block 208, a SlideObj container is created for each Slide HTML page. Each SlideObj container includes all of the objects in the corresponding Slide HTML page. The SlideObj container sets a default font size and default vertical and horizontal dimensions of a display space with divisions created by DIV tags. The SlideObj container also includes a flag for hiding the graphical display of the contents of the SlideObj container. Next, in a block 210, a flag for hiding the graphical display of the contents of each Slide HTML page is set on in each SlideObj container. The logic moves next to a block 212 and the clip region boundaries, i.e., the edges of the display space, are set for each of the Slide HTML pages. Moving forward, at a block 214, a loop counter value (M) is set equal to 1.

The logic flow of diagram 200 is continued in FIG. 9B. For the Mth slide, the logic identifies each object and the type of the object. See block 216. Then, in block 218, the logic calculates a position and size for each identified object as percentages with respect to the percentage based vertical and horizontal dimensions of the Mth Slide HTML page. At block 220, the logic employs the calculated percentages to nest each object in divisions created by DIV tags within the display space of the Mth Slide HTML page.

Stepping to a decision block 222, the logic determines if any of the nested objects have a hyperlink associated with the object. As discussed above, hyperlinks may be associated with different types of objects such as text, images, or regions in the display space. If the determination is positive, the logic moves to a block 224 and identifies each determined hyperlink as an image map. Moving to a block 226, the logic writes the name of each image map in the corresponding Mth Slide HTML page. At a block 228, the logic calculates a percent font size for the Mth Slide HTML page based on the default font size included in the SlideObj container. If the determination at decision block 222 had been negative, the logic would have stepped directly to a block 228.

Moving forward to a decision block 230, the logic determines if any text objects are nested in the Mth slide, e.g., bulleted text in a presentation. If true, in block 232, another percent font size for each nested text object with respect to the percent font size for the Mth Slide HTML page is calculated. Then, in a block 234, the logic writes the calculated other percent font size for each nested text object in the Mth Slide HTML page. Next, at block 236, the logic sets the loop counter value of M equal to M+1. Flowing to a decision block 238, the logic determines if the value of M is equal to N, i.e., the total number (N) of Slide HTML pages has been processed by the first facility. If the determination is negative, the logic loops back to block 218 and repeats the logic flow discussed above for the next slide (M+1). If the determination at block 238 is positive, the logic advances to a block 240 and a script file is bound to the SlideObj container. The logic performed by the first facility of the present invention then concludes.

Flow Diagram for Automatically Fitting a Graphical Display to a Display Window

Figure 10A:
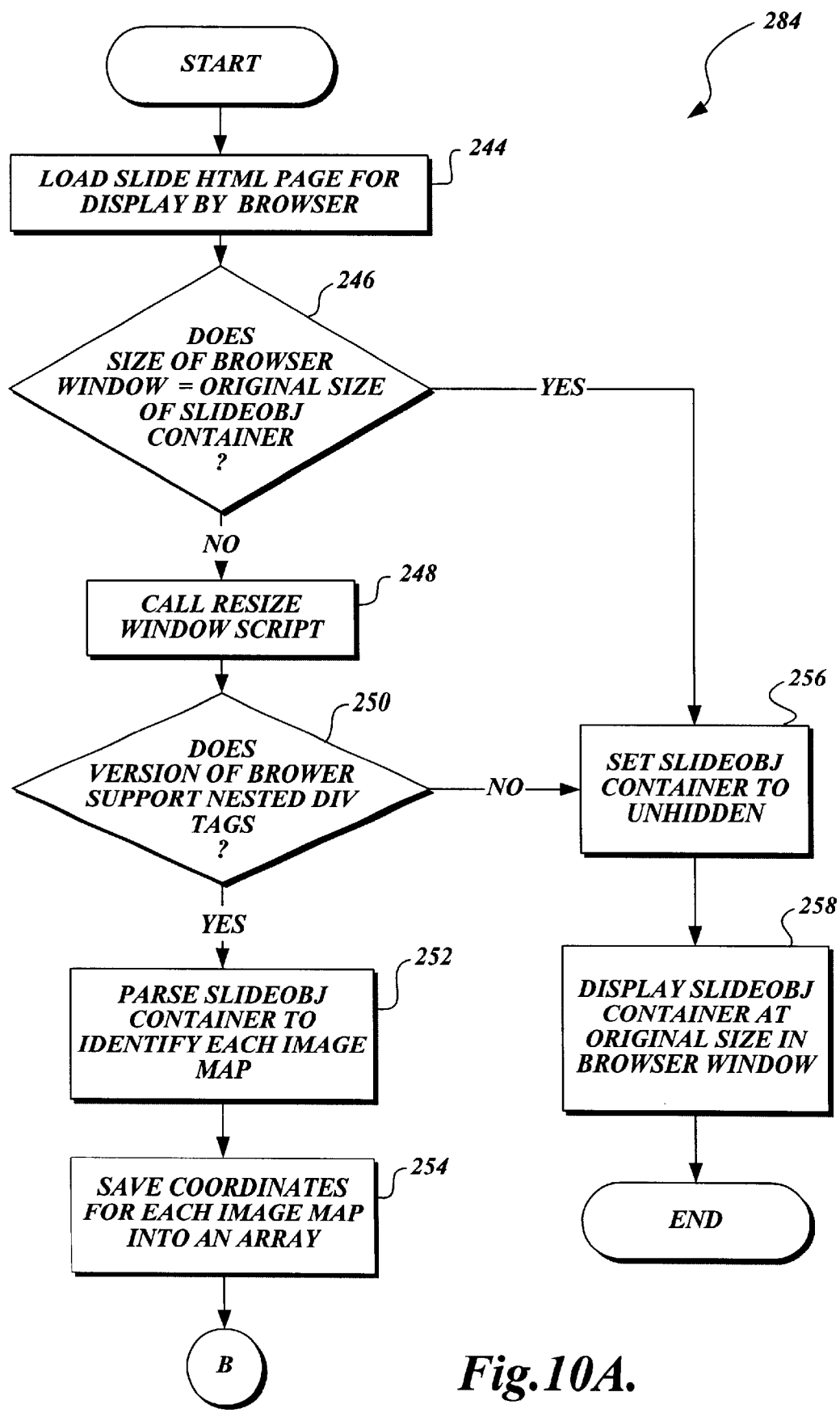
FIGS. 10A, 10B and 10C show an overview of a method for resizing the display of a scalable Slide HTML page to accommodate the size of a display window in the browser.
Figure 10B:
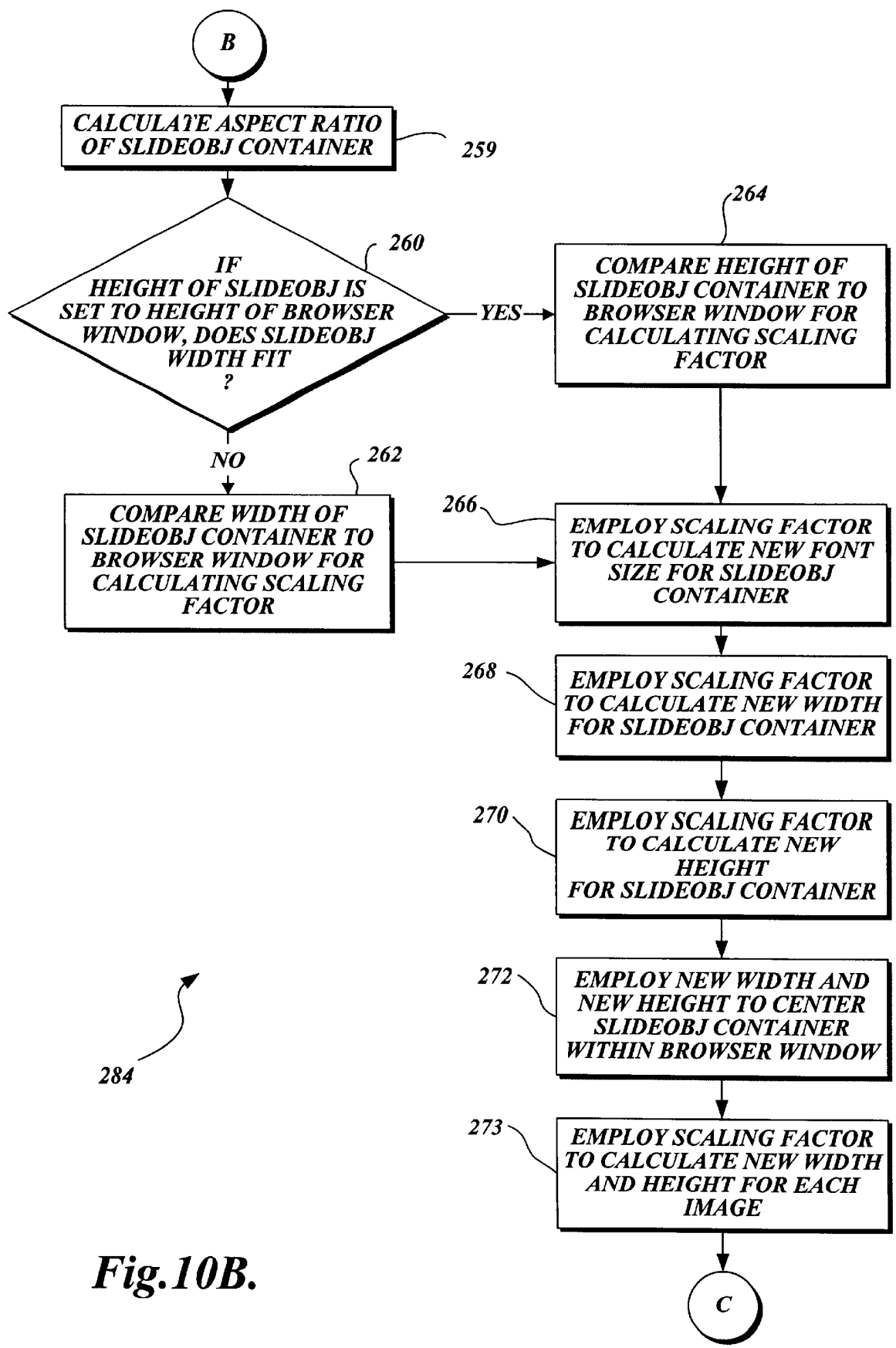
Figure 10C:
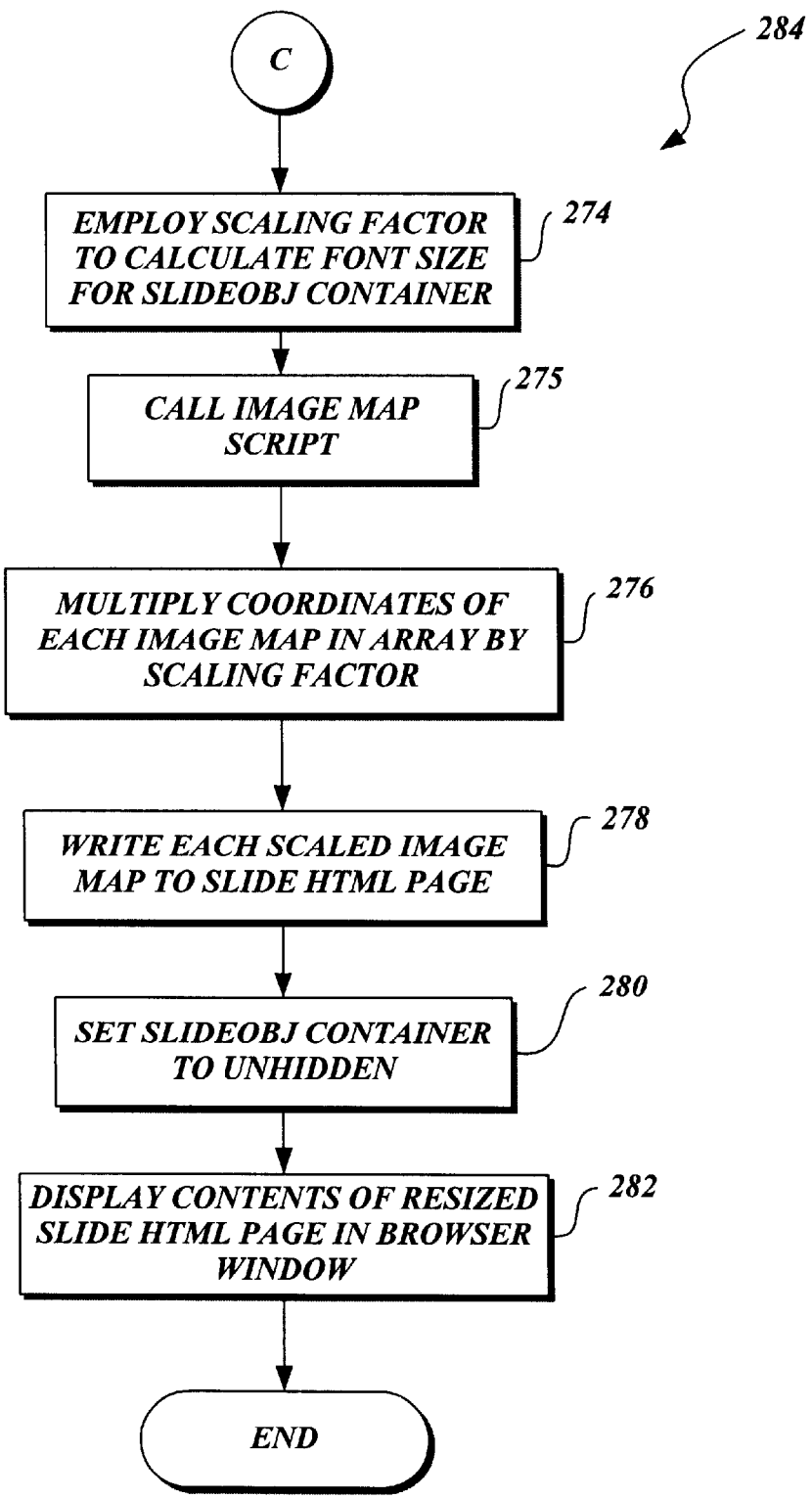
Figure 11:
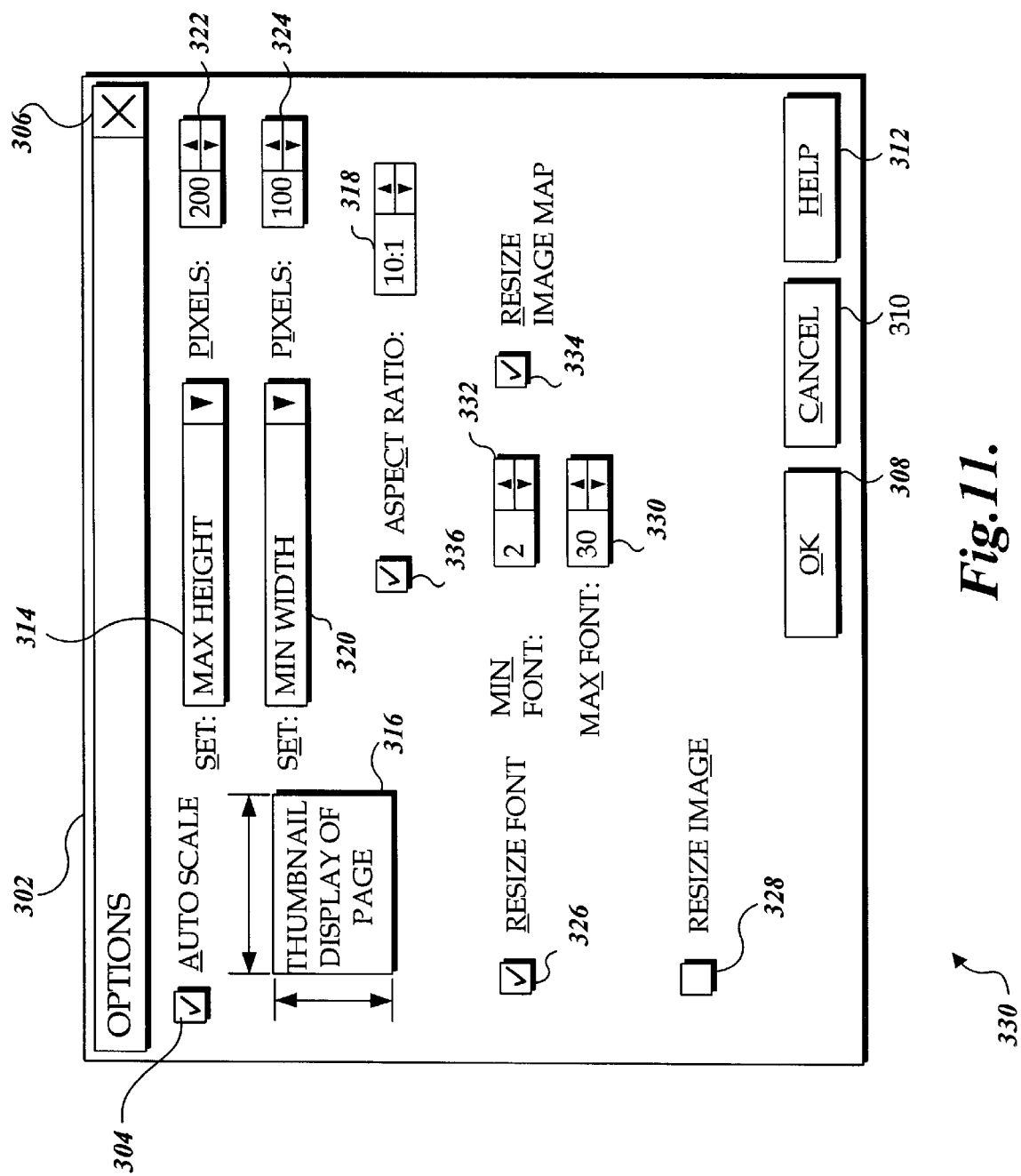
FIG. 11 shows an exemplary embodiment of a graphical user interface window for selecting different options in the graphical display of the scalable Slide HTML page.

The logic 284 employed by the second facility of the present invention that fits, i.e., redimensions and repositions, a graphical display of the objects in a Slide HTML page to the size and resolution of a display window in a browser is shown in flow diagram form in FIGS. 10A, 10B and 10C. Moving from a start block to a block 244, the logic loads the first of the Slide HTML pages. Moving to a decision block 246, the logic determines if the dimensions of the browser's display window are equal to the dimensions originally encoded for the display of a selected Slide HTML page. If this determination is positive, the logic moves to a block 256 where a flag in the SlideObj container is set off. When this flag is set off, the graphical display of the objects included in the SlideObj container for the selected Slide HTML page are hidden, i.e, not displayed to the user. At a block 258, the browser graphically displays the Slide HTML page's objects in the browser's display window using the dimensions originally encoded and the logic flow ends.

If the determination in decision block 246 is negative, the logic flows to a block 248 and a script file is called that includes scripts for fitting the graphical display of different types of objects in the selected Slide HTML page to the dimensions of the display window in the browser. The scripts use the selected Slide HTML page's percent based font sizes and dimensions to fit objects to the dimensions of the browser's display window. Percentage based calculations are used by the scripts to determine new positions and dimensions for the different types of objects.

At a decision block 250, the logic determines if the version of the browser supports percentage based dimensioning and positioning in divisions created by nested DIV tags. If false, the logic moves to block 256 and the SlideObj container's flag that hides the graphical display of the objects included in the container for the selected Slide HTML page is set off. Advancing to block 258, the logic displays the objects included in the selected Slide HTML page without having fitted the objects to the dimensions and/or resolution of the display window.

Alternatively, if the logic determines at block 250 that the version of the browser does support the nesting of different types of objects with DIV tags, the logic moves to a block 252, where the objects included in the SlideObj container for the selected Slide HTML page are parsed and each image map object in the page is identified. Then in a block 254, the logic saves the coordinates for each image map object in the display space of the selected Slide HTML page and stores these coordinates in an array for all of the identified image map objects.

The logic flow continues from block 254 shown in FIG. 10A to a block 259 illustrated in FIG. 10B. The present invention calculates the aspect ratio (width dimension divided by height dimension) of the SlideObj container. Stepping to a decision block 260, the logic determines, if the height dimension of the SlideObj container is set to the height of the browser window, will the SlideObj container's width dimension, dictated by the aspect ratio, fit in the width of the browser window. As discussed above, a Slide HTML page's height dimension is defined by the number of pixel based lines of resolution horizontally aligned in the display space. In this embodiment, the number of horizontal lines of resolution in the browser's display window is compared to the selected Slide HTML page's originally encoded number of horizontal lines to determine a difference in height dimensions. Because the number of pixels (lines) are used to define the height dimension of the display space of the selected Slide HTML page, this embodiment of the present invention automatically recognizes a difference in heights when either the resolution of the video display has changed or the display window's height is different than the originally encoded height dimension of the display space.

If the determination at decision block 260 is true, the logic moves to a block 264 where the height dimension included in the SlideObj container for the selected Slide HTML page is compared to the height dimension of the browser's display window and a scalar value is calculated. The value of the scalar is based on a measured difference between the height dimensions included in the SlideObj container for the selected Slide HTML page and the display window. Moving to a block 266, the scalar is employed to calculate a new reference font size for the SlideObj container for the selected Slide HTML page.

If the logic determines in decision block 260 that the width dimension of the SlideObj container should be changed, the logic advances to a block 262. In this case, the logic compares the width dimension in the SlideObj container for the selected Slide HTML page to the width dimension of the display window and a scalar is calculated based on the difference in widths comparison. Similarly, the number of pixels (vertical lines) are used to define the width dimension of the display space defined by the SlideObj container for the selected Slide HTML page. This embodiment of the present invention automatically recognizes a difference in width dimensions between the display space in the SlideObj container for the selected Slide HTML page and the display window when either the resolution of the video display has changed or the display window's height dimension is different than the originally encoded height dimension for the page. Next, the logic also flows to block 266 where the calculated scalar is used to calculate a new percent font size for the Slide HTML page.

Moving to a block 268, the logic employs the scalar to calculate a new width dimension for the display space included in the SlideObj container for the selected Slide HTML page. Then, in a block 270, the scalar is employed to calculate a new height dimension for the display space included in the SlideObj container for the selected Slide HTML page. Next, in a block 272, the new width and height dimensions are used in the centering the display space defined by the SlideObj container for the selected Slide HTML page within the dimensions of the browser's display window. At a block 273, the scaling factor is employed to calculate new width and height dimensions for each of the image objects included in the SlideObj container for the selected Slide HTML page. In the case of an image object based on a bitmap, the explicit dimensions of the image objects are multiplied by the scalar. Although a typical type for an image object is a device independent bitmap (DIB), another type of image object such as a vector graphic may be included in a Slide HTML page. The scalar could be similarly employed to resize other types of image object.

The logic flow continues from block 273 shown in FIG. 10B to a block 274 illustrated in FIG. 10C where the scaling factor is employed to calculate a new font size for the SlideObj container. To do this, the present invention multiplies the original font size of the SlideObj container by the scaling factor calculated above. Since each text object has a font size that is based on a percentage of the font size for the SlideObj container, the font size of each text object is automatically updated when a new font size is calculated for the SlideObj container. Moving to a block 275, an image map script is called for scaling the coordinates of the image maps stored in the array. Then, at a block 276, the logic employs the script to multiply the coordinates of each image map in the array by the scalar to generate new coordinates for each image map object. Flowing to a block 278, the new coordinates for each image map are written to the SlideObj container for the selected Slide HTML page. Advancing to a block 280, the logic sets "off" the flag for hiding the graphical display of the objects included in the SlideObj container for the selected Slide HTML page so that the objects in the page may be displayed. Moving to a block 282, a repositioned and redimensioned graphical display of every object in the SlideObj container for the Slide HTML page is displayed within the dimensions of the browser's window. Since the position of each object in the display space defined by the SlideObj container for the selected Slide HTML page is determined by a division created with a nested DIV tag, the graphical display of each object will automatically be repositioned to fit the new dimensions of the display space included in the container. Once the graphical display for the objects included in the SlideObj container for the selected Slide HTML page are fitted to the dimensions of the browser's display window, the logic flow ends.

Exemplary Graphical User Interface

In FIG. 14, an overview 300 of an exemplary user interface window 302 is shown for graphically displaying selectable options to a user. The selection of an autoscale check box 304 causes the present invention to automatically fit the graphical display of every object included a SlideObj container for a selected Slide HTML page to the dimensions of a display window in a browser. However, if check box 304 is not selected, the present invention will not fit the graphical display of the selected Slide HTML page to the dimensions of the browser's display window.

A thumbnail image 316 is provided that graphically displays all of the objects in the selected Slide HTML page. A height drop-down menu 314 is provided to set either the maximum height or minimum height (not shown) for the graphical display of the display space included in the SlideObj container for the selected Slide HTML page. A spinner control 322 coupled to the height drop-down menu 314 and enables the selection of the number of lines of resolution (pixels) for the maximum and minimum heights that the present invention can use in fitting the height of the display space into a browser's display window. Similarly, a drop-down menu 320 is provided to set the maximum and minimum widths (not shown) that the present invention may use in resizing the width of the display space. A spinner control 324 coupled to the width drop-down menu 320 that enables the selection of the number of lines of resolution for the maximum and minimum widths of the display space.

Further, a check box 336 and an associated spinner control 318 allows the aspect ratio employed by the present invention when fitting the graphical display to a display window of a browser to be selected. Another check box 326 and an associated min font spinner control 332 and an associated max font spinner control 330 enables the selection of the maximum and minimum sizes of the fonts to be graphically displayed. Additionally, when a further check box 328 is selected, the herein disclosed embodiment of the present invention automatically resizes the dimensions of the graphical display of image objects to fit a browser's display window. Similarly, when another check box 334 is selected, the present disclosed embodiment of the invention automatically redimensions the graphical display of image maps to fit a browser's display window.

When a close box 306 is selected, the user interface window 302 is closed. The selection of an OK button 308 confirms the options selected in the user interface window 302 and closes the window. If a cancel button 310 is selected, the user inter face window 302 closes and the present invention disregards any changes to the options selected in the window. Also, the selection of a help button 312 causes a facility to display information explaining the options that are selectable in the user interface window 302.

Although the embodiment of the present invention described above employs the HTML computer language, it is to be understood that the invention is also applicable to other types of computer languages that support percentage based nesting of a size and a position of an object, including DHTML, CGI, VRHTML, ADA and C++. It is further to be understood that the first and second facilities could operate within the same program. For example, a program that initially is employed to create the object that is translated into an HTML object included in a SlideObj container for a Slide HTML page could also be associated with displaying the display window.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A method for automatically fitting the graphical display of an object in a display space to the size of a display window, comprising:
   (a) saving a page that includes an object in a scalable page;
   (b) generating a size for a display space of the scalable page, the size of the display space being related to a default size of a container for the scalable page;
   (c) generating a size and a position for the object included in the scalable page, the size and the position of the object being related to the size of the display space of the scalable page;
   (d) determining if a dimension of a display window is different than a corresponding dimension of the display space of the scalable page, and if so
      (i) generating a scalar that is related to the difference in the dimension of the display window and the corresponding dimension of the display space of the scalable page, the scalar being employed to calculate another size for the display space of the scalable page that is related to the size of the display window and the default size of the master display space, the calculation of the other size of the display space causing the related size and position of the object to be changed in proportion to the other size of the display space; and (ii) automatically relocating the graphical display of the display space of the scalable page and the changed size and position of the object in the display window, so that a user can view the object in the display space without having to scroll the display window.

2. The method of claim 1, wherein the other type of page is a slide created with a presentation program.

3. The method of claim 1, wherein the other type of page is a document created with an editor.

4. The method of claim 1, wherein the scalable page, the master page and the object are encoded with a computer language selected from the group comprising HTML, DHTML, CGI, Javascript and VRHTML.

5. The method of claim 4, further comprising employing a DIV tag to create sizes and positions for the scalable page, the display space and the object that are percent based.

6. The method of claim 1, wherein automatically locating the graphical display of the scalable page's display space and the changed size and position of the object in the display window further comprises graphically displaying the display space and the object after the display space and the object have been located in the display window.

7. The method of claim 1, wherein generating the scalar further comprises determining a value for the scalar that will retain an original aspect ratio when sizing the display space and the object to fit the size of the display window.

8. The method of claim 1, wherein generating the scalar further comprises selecting another aspect ratio that is used for sizing the display space and the object to fit the size of the display window.

9. The method of claim 1, further comprising determining that the object is a text object, the text object being associated with a percent-based font size that is related to a default font included in the master page.

10. The method of claim 9, further comprising calculating another percent font size for the text object, the other percent-based font size being proportionally resized with the scalar.

11. The method of claim 9, further comprising identifying another text object that is nested in the text object, the other text object having a nested percent-based font size that is related to the percent-based font size of the text object.

12. The method of claim 10, wherein calculating the other percent-based font size for the text object is limited to calculating at least a minimum size of font, the minimum size of font being selectable.

13. The method of claim 10, wherein calculating the other percent-based font size for the text object is limited to calculating no more than a maximum size of font, the maximum size of font being selectable.

14. The method of claim 9, wherein determining that the object is the text object further comprises determining that the text object is selected for sizing to fit the size of the display window.

15. The method of claim 1, further comprising:
(a) determining the object included in the scalable page to be an image map object, the image map object being associated with a hyperlink; and
(b) storing a set of coordinates for the image map object in an array, the set of coordinates defining a size and a position of the image map object in the display space of the scalable page.

16. The method of claim 15, further comprising:
(a) calculating another set of coordinates for the image map object that are proportional to the scalar; and
(b) employing another size and another position defined by the other set of coordinates to graphically display the image map object in the display space of the scalable page.

17. The method of claim 15, wherein determining that the object included in the scalable page is the image map object further comprises determining that the image map object is selected for sizing to fit the size of the display window.

18. The method of claim 1, further comprising determining the object included in the display space of the scalable page to be an image object, the image object having a type that includes bitmap and vector graphic.

19. The method of claim 18, wherein determining that the object included in the scalable page is the image object further comprises determining that the image object is selected for sizing to fit the size of the display window.

20. The method of claim 1, wherein the display window is associated with a program that comprises a browser and an editor.

21. The method of claim 1, further comprises a flag in the scalable page that must be set before the object and the display space for the scalable page are graphically displayable in the display window.

22. The method of claim 1, wherein the dimensions of the display window, the display space, the master display space, and the dimensions and position of the object are measured in lines of resolution, so that the graphical display of the display space and the object in the display window will automatically adjust to the lines of resolution being employed to graphically display the display window in a video display.

23. The method of claim 22, wherein the graphical display of the object in the display space is automatically fitted to the size of the display window when the lines of resolution used to graphically display the display window are changed.

24. The method of claim 22, wherein each line of resolution relates to one pixel in a video display.

25. The method of claim 22, wherein a width dimension for the display window is defined by a number of horizontal lines of resolution and a height dimension for the display window is defined by a number of vertical lines of resolution.

26. The method of claim 1, wherein the graphical display of the object in the display space is automatically fitted to the size of the display window when at least one of the dimensions of the display window is dynamically changed.

27. A computer readable media having computer executable instructions for performing the method recited in any one of claims 1, 6, 8, 14 or 17.

28. A method for automatically fitting the graphical display of an object in a display space to the size of a display window, comprising:
(a) employing a first facility for generating a scalable page, the first facility implementing actions, including:
(i) saving a page that includes an object in a scalable page;
(ii) generating a size for the display space of the scalable page, the size of the display space being related as a percentage to a default size of a container for the scalable page;
(iii) generating a size and a position for the object included in the scalable page, the size and the position of the object being related as a percentage to the size of the display space of the scalable page; and (b) employing a second facility to determine when a dimension of the display window is different than a corresponding dimension of the display space of the scalable page, if true the other facility implementing actions, including:
  (i) generating a scalar that is related to the difference in the dimension of the display window and the corresponding dimension of the size of the display space of the scalable page, the scalar being employed to calculate another size for the display space of the scalable page that is related as a percentage to the size of the display window and the default size of the master display space, the calculation of the other size of the display space causing the related size and position of the object to be changed in proportion to the other size of the display space; and
  (ii) automatically locating the graphical display of the display space of the scalable page and the changed size and position of the object in the display window, so that a user can view the object in the display space without having to scroll the display window.

29. The method of claim 28, wherein the first facility is a module that is executed within a program that created the other type of page.

30. The method of claim 28, wherein the second facility is a module that is executed by a program associated with the display window.

31. A computer system for automatically fitting the graphical display of an object to the size of a display window, comprising:
  (a) a memory that stores a plurality of logical instructions;
  (b) a display for graphically displaying the object to a user; and
  (c) a processor coupled to the memory, the processor implementing the logical instructions, including:
    (i) saving a page that includes the object in a scalable page;
    (ii) generating a size for a display space of the scalable page, the size being related to a default size of a master display space of a master page that is provided as a container for the scalable page;
    (iii) generating a size and a position for the object included in the scalable page, the size and the position of the object being related to the size of the display space of the scalable page; and
    (iv) determining if a dimension of the display window is different than a corresponding dimension of the size of the display space of the scalable page, if so:
      (aa) generating a scalar that is related to the difference in the dimension of the display window and the corresponding dimension of the size of the display space of the scalable page, the scalar being employed to calculate another size for the display space of the scalable page that is related to a size of the display window and the default size of the master display space, the calculation of the other size of the display space causing the related size and position of the object to be changed in proportion to the other size of the display space; and
      (bb) automatically locating the graphical display of the scalable page's display space and the changed size and position of the object in the display window, so that a user can view the object in the display space without having to scroll the display window.

32. A method for automatically fitting the graphical display of a scalable page to the size of a display window comprising:
  (a) generating a size for a display space of a scalable page;
  (b) generating a size and a position for an object included in the scalable page;
  (c) determining if a dimension of a display window is different than a corresponding dimension of the display space of the scalable page, the size of the display space being related as a percentage to a default size of a container for the scalable page, the scalable page including the object that has the size and the position related as a percentage to the size of the display space of the scalable page and if the determination is true:
    (i) generating a scalar that is related to the difference in the dimension of the display window and the corresponding dimension of the size of the display space of the scalable page, the scalar being employed to calculate another size for the display space of the scalable page that is related as a percentage to the size of the display window and the default size of the master display space, the calculation of the other size of the display space causing the related size and position of the object to be changed in proportion to the other size of the display space; and
    (ii) automatically locating the graphical display of the display space of the scalable page and the changed size and position of the object in the display window, so that a user can view the object in the display space without having to scroll the display window.

* * * * *

UNITED STATES PATENT AND TRADEMARK OFFICE
CERTIFICATE OF CORRECTION

PATENT NO. : 6,456,305 B1  Page 1 of 1
DATED : September 24, 2002
INVENTOR(S) : I.I. Qureshi et al.

It is certified that error appears in the above-identified patent and that said Letters Patent is hereby corrected as shown below:

Column 1,
Line 6, "FILED" should read -- FIELD --

Column 2,
Line 64, "page of Microsoft corporation>microsoft corporation</A home page." should read -- Microsoft Corporation>Microsoft Corporation</A>home page. --

Column 3,
Line 8, "bold," should read -- bold, --
Line 8, "italic." should read -- *italic.* --
Line 10, "Microsoft Corporation" should read -- Microsoft Corporation --

Column 6,
Line 28, "EMBODIMENTS" should read -- EMBODIMENT --

Column 10,
Line 35, "200," should read -- 200, --

Column 17,
Line 21, "percent based" should read -- percent-based --

Column 20,
Line 18, "display window" should read -- display window, --
Line 31, "scalable page and" should read -- scalable page, and --

Signed and Sealed this

Eighth Day of April, 2003

JAMES E. ROGAN
*Director of the United States Patent and Trademark Office*